(12) United States Patent
Kumar

(10) Patent No.: US 11,042,488 B2
(45) Date of Patent: Jun. 22, 2021

(54) DIVERSIFYING A BASE SYMMETRIC KEY BASED ON A PUBLIC KEY

(71) Applicant: Cryptography Research, Inc., Sunnyvale, CA (US)

(72) Inventor: Ambuj Kumar, Sunnyvale, CA (US)

(73) Assignee: Cryptography Research, Inc., San Jose, CA (US)

( * ) Notice: Subject to any disclaimer, the term of this patent is extended or adjusted under 35 U.S.C. 154(b) by 215 days.

(21) Appl. No.: 15/166,700

(22) Filed: May 27, 2016

(65) Prior Publication Data

US 2017/0244679 A1 Aug. 24, 2017

Related U.S. Application Data

(60) Provisional application No. 62/169,441, filed on Jun. 1, 2015.

(51) Int. Cl.
*G06F 12/14* (2006.01)
*H04L 9/32* (2006.01)
*H04L 9/08* (2006.01)
*H04L 29/06* (2006.01)

(52) U.S. Cl.
CPC ........ *G06F 12/1408* (2013.01); *H04L 9/0825* (2013.01); *H04L 9/0861* (2013.01); *H04L 9/3242* (2013.01); *H04L 63/06* (2013.01); *G06F 2212/1052* (2013.01)

(58) Field of Classification Search
CPC ............... H04L 63/0435; H04L 63/061; H04L 63/0442; H04L 9/3242; H04L 9/0631; G06F 12/1408; G06F 2212/1052

USPC ......................................................... 713/171
See application file for complete search history.

(56) References Cited

U.S. PATENT DOCUMENTS

| | | | |
|---|---|---|---|
| 5,144,665 A | 9/1992 | Takaragi et al. | |
| 7,624,269 B2 | 11/2009 | Appenzeller et al. | |
| 8,233,617 B2 | 7/2012 | Johnson et al. | |
| 8,340,283 B2 | 12/2012 | Nadalin et al. | |
| 8,843,764 B2 | 9/2014 | Hussain | |
| 2003/0233550 A1* | 12/2003 | Brickell | G06F 21/85 713/171 |
| 2008/0069343 A1 | 3/2008 | Greco et al. | |
| 2011/0208970 A1* | 8/2011 | Brown | H04L 9/0844 713/176 |
| 2017/0026174 A1* | 1/2017 | Pang | H04L 63/18 |

* cited by examiner

*Primary Examiner* — Jeffrey C Pwu
*Assistant Examiner* — Nega Woldemariam
(74) *Attorney, Agent, or Firm* — Lowenstein Sandler LLP

(57) ABSTRACT

A symmetric key that is stored at a device may be received. A public key from a remote entity may also be received at the device. Furthermore, a derived key may be generated based on a one way function between the symmetric key that is stored at the device and the public key that is received from the remote entity. The derived key may be encrypted with the public key and transmitted to the remote entity. The encryption of the derived key with the public key may provide secure transmission of the derived key to an authorized remote entity with a private key that may be used to decrypt the encrypted derived key.

19 Claims, 11 Drawing Sheets

DIVERSIFYING A BASE SYMMETRIC KEY BASED ON A PUBLIC KEY

RELATED APPLICATION

This application claims the benefit under 35 U.S.C. § 119(e) of U.S. Provisional Application 62/169,441 filed on Jun. 1, 2015, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
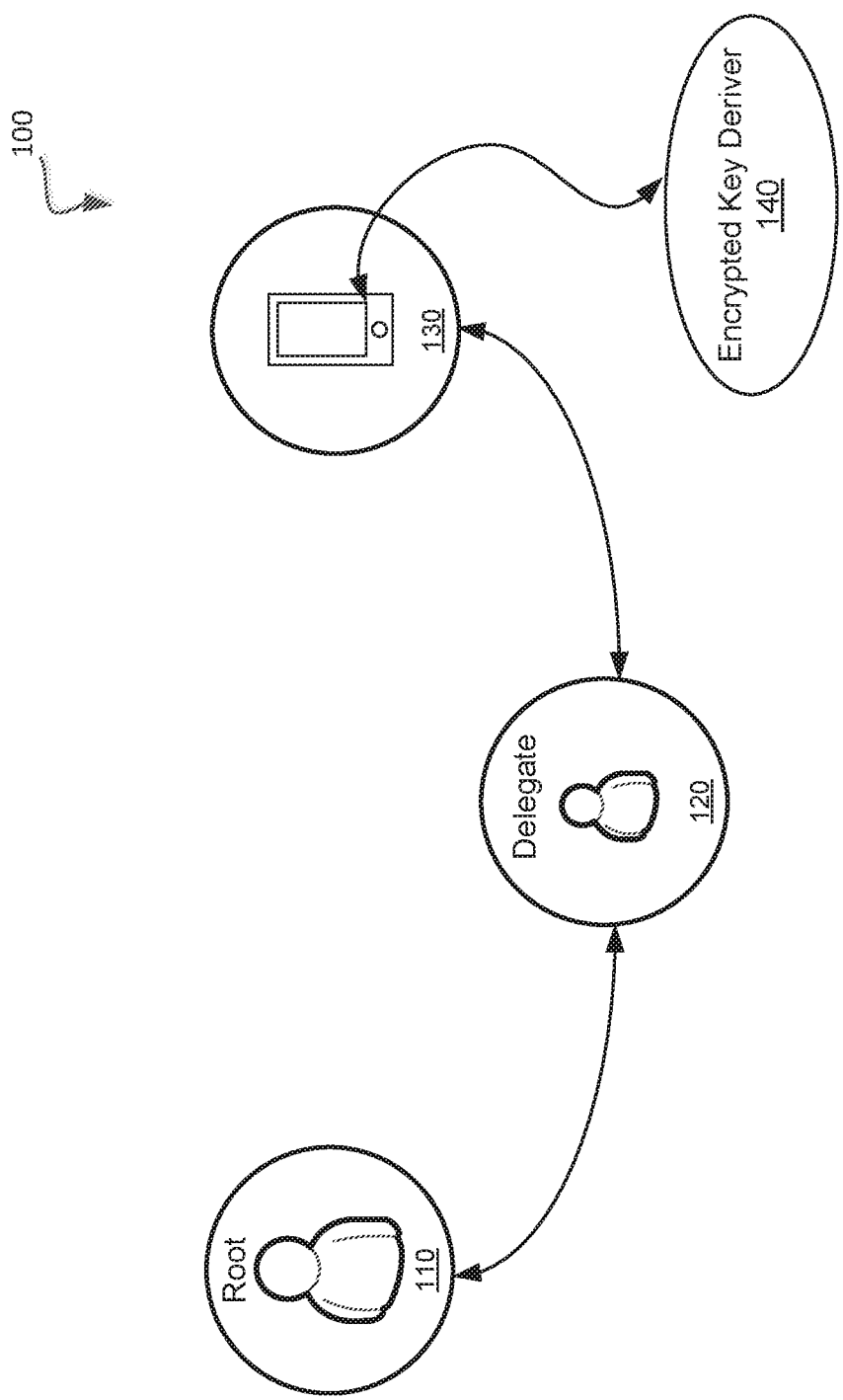
FIG. 1 illustrates an example environment with a device that includes an encrypted key deriver in accordance with some embodiments.

Aspects of the present disclosure are directed to diversifying a base symmetric key based on a public key. The diversifying of the base symmetric key may refer to the generating of another key, referred to as a derived key, from a combination of the base symmetric key and a public key. The derived key may be used to facilitate secure communication between two entities. For example, the derived key may be used to encrypt and/or decrypt communications between a remote entity that provides the public key and a device that includes the base symmetric key and generates the derived key.

The base symmetric key may be stored in a memory, such as a one-time programmable (OTP) memory, of the device. Furthermore, the base symmetric key may be used to encrypt and decrypt data. For example, a symmetric key may be used to encrypt data as well as to decrypt the data that has been encrypted by the same symmetric key. The public key may correspond to a key from an asymmetric key pair. For example, an asymmetric key pair may include a public key and a private key that are mathematically linked or correspond to each other. The public key may be used to encrypt data and the corresponding private key may be used to decrypt the data that has been encrypted by the corresponding public key of the asymmetric key pair. Furthermore, the private key may be used to create a digital signature and the corresponding public key may be used to verify or authenticate the digital signature. The derived key may thus be a combination of a symmetric key (e.g., the base symmetric key stored at the device) and a public key of an asymmetric key pair (e.g., the public key received by the device from the remote entity).

Furthermore, the derived key may be used to transmit secure communications or data between the remote entity and the device. For example, the derived key may be transmitted to the remote entity to encrypt and decrypt data transmitted between the remote entity and the device. The remote entity may encrypt data with the derived key and the device may decrypt the data that has been encrypted with the same derived key (and vice versa).

The public key that is received by the device may additionally be used to securely transmit the derived key from the device to the remote entity. For example, after generating the derived key, the device may further encrypt the derived key with the same public key that was received from the remote entity and that was used to generate the derived key. The encrypted derived key may then be transmitted from the device to the remote entity that may subsequently decrypt the encrypted derived key with a private key that corresponds to the public key that was used to encrypt the derived key. The remote entity may then use the derived key to encrypt data transmitted to the device and to decrypt data received from the device.

Since the derived key is generated from the base symmetric key that is stored at the device and a public key that is received by the device, different derived keys may be generated based on the same base symmetric key and the different public keys that are received by the device. For example, a first remote entity may transmit a first public key to the device and a first derived key may be generated based on a combination of the base symmetric key and the first public key. A second remote entity may transmit a second public key to the device and a second derived key may be generated based on a combination of the same base symmetric key and the second public key.

As such, the diversifying of a base symmetric key with a public key to generate a derived key based on a combination of the base symmetric key and the public key may allow multiple derived keys to be generated based on a single base symmetric key that is stored at the device. Since one base symmetric key may be used to generate multiple derived keys, less memory space may be utilized within the device as the single base symmetric key as opposed to multiple base symmetric keys may be stored in memory. Furthermore, the generating of the derived key from a public key may be more secure than the generation of the derived key from other data such as an entity identification. For example, the derived key may be encrypted by the same public key that is used to generate the derived key.

FIG. 1 illustrates an example environment 100 with a device that includes an encrypted key deriver. In general, the environment 100 includes a root entity 110, a delegate entity 120, and a device 130 that includes an encrypted key deriver 140.

As shown in FIG. 1, the environment 100 includes a root entity 110 and a delegate entity 120. The root entity 110 may generate a root signed block (RSB) that includes a public key of the delegate entity 120. For example, the delegate entity 120 may generate a public-private key pair (e.g., a public key and a private key or asymmetric key pair) and may provide the public key of the key pair to the root entity 110. In response to receiving the public key, the root entity 110 may generate an RSB that includes the public key generated by the delegate entity 120. The RSB may be data that includes the public key and is encrypted or signed by the root entity 110. For example, the RSB may be signed by a private key of another public-private key pair that is associated with the root entity 110. The root entity 110 may return the RSB to the delegate entity 120. Furthermore, the delegate entity 120 may transmit the RSB that includes its public key to the device 130.

As previously described, the RSB may be signed by the private key of the root entity 110. In some embodiments, the device 130 may store the corresponding public key of the root entity 110. Thus, the device 130 may verify the RSB that is signed by the private key of the root entity 110 by using the public key of the root entity 130 that is stored at the device 130. After verifying the RSB with the private key of the root entity 130, the device 130 may be able to retrieve the public key of the delegate entity 120 that was included in the RSB. Subsequently, the delegate entity 120 may generate a delegate signed block (DSB) that is signed by the private key of the delegate 120. The DSB may be transmitted from the delegate entity 120 to the device 130 and the device 130 may verify the DSB by using the previously retrieved public key of the delegate entity 120 from the previously received RSB.

The device 130 may also include an encrypted key deriver 140. In some embodiments, the encrypted key deriver 140 may generate a derived key for communication or transmission of data between the delegate entity 120 and the device 130. For example, the derived key may be generated based on a base symmetric key stored at the device 130 and the public key of the delegate entity 120 that was retrieved from the RSB that was signed by the root entity 110.

Figure 2:
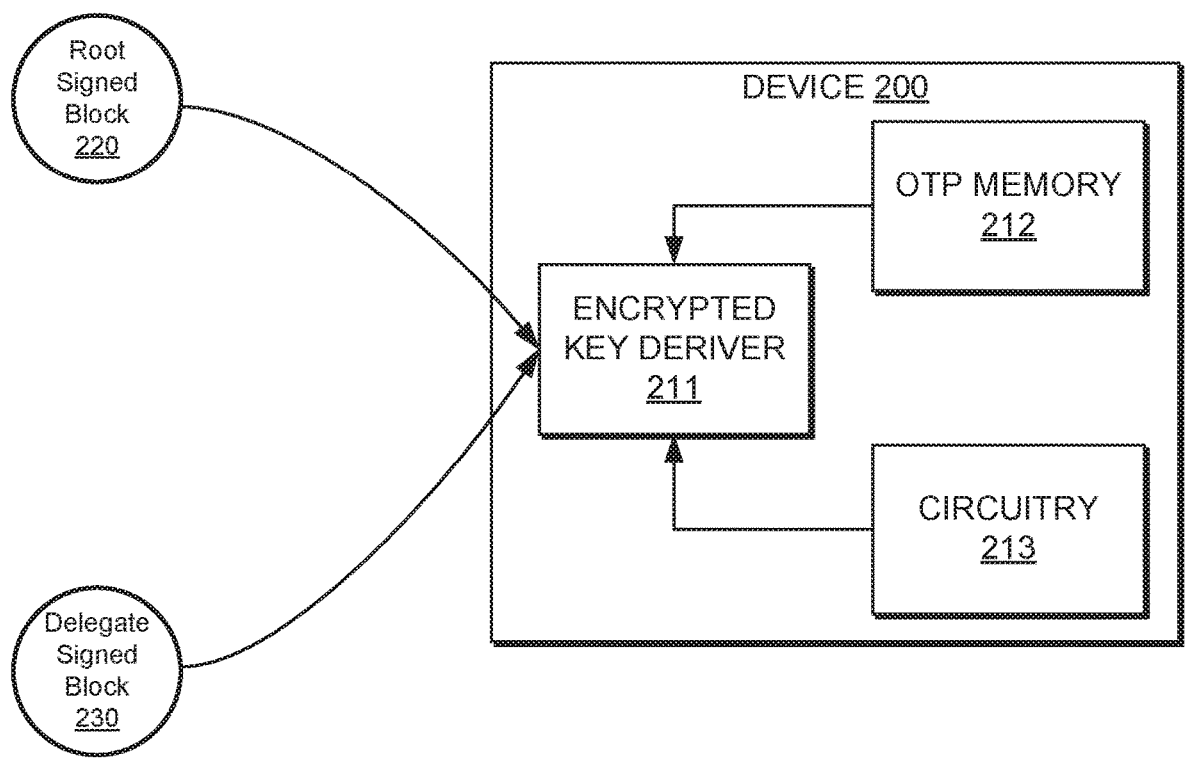
FIG. 2 illustrates an example device with an encrypted key deriver in accordance with some embodiments.

FIG. 2 illustrates an example device 200 with an encrypted key deriver. In general, the device 200 may correspond to an integrated circuit such as a system on a chip (SoC) or an electronic device. The device 200 may correspond to the device 130 of FIG. 1.

As shown in FIG. 2, the device 200 may include an encrypted key deriver 211, an OTP memory 212, and a netlist 213. The encrypted key deriver 211 may correspond to the encrypted key deriver 140 of FIG. 1. The OTP memory 212 of the device 200 may store a base symmetric key. The OTP memory 212 may be a type of digital memory implemented in circuitry or silicon of the device 200 that may be programmed and cannot be changed after being programmed. For example, data (e.g., the base symmetric key) may be programmed into the OTP memory 212 of the device 200 and the data may not be changed in the OTP memory 212 after the programming of the data into the OTP memory 212. Furthermore, the OTP memory 212 may be a type of digital memory where the setting of each bit of the OTP memory 212 is locked by a fuse (e.g., an electrical fuse associated with a low resistance and designed to be permanently break an electrically conductive path after the programming or setting of a corresponding bit) or an antifuse (e.g., an electrical component associated with an initial high resistance and designed to permanently create an electrically conductive path after the programming or setting of a corresponding bit). As an example, each bit of the OTP memory 212 may start with an initial value of '0' and may be programmed or set to a later value of '1' (or vice versa). Thus, in order to program or set a base symmetric key with a value of '10001' into the OTP memory 212, two bits of the OTP memory 212 may be programmed from the initial value of '0' to the later value of '1.' Once the two bits of the OTP memory 212 have been programmed to the later value of '1', then the two bits may not be programmed to the value of '0.' As such, the bits of the OTP memory 212 may be programmed once and may not be changed once programmed.

The circuitry 213 of the device 200 may store the public key of a root entity. In some embodiments, the circuitry 213 may be part of an integrated circuit of the device 200. For example, the circuitry 213 may refer to the connectivity of circuit components of an integrated circuit of the device 200. Although circuitry is shown and described as storing the public key of a root entity, any other memory elements (e.g., a read-only memory) may also be used to store the public key of the root entity. Thus, the public key of the root entity may be an immutable value that is embedded or stored in a component (e.g., circuits or other memory elements) of the integrated circuit of the device.

Referring to FIG. 2, the device 200 may further include an encrypted key deriver 211 that may receive the base symmetric key stored in the OTP memory 212 and the root entity public key stored in the circuitry 213. The encrypted key deriver 211 may receive a root signed block 220 that is signed by a root entity (e.g., root entity 110) from a delegate entity (e.g., delegate entity 120) that includes the delegate entity's public key. In response to receiving the RSB 220, the encrypted key deriver 211 may verify the RSB 220 by using the root public key retrieved from the circuitry 213. For example, the RSB 220 may be signed by a private key of the root entity and the root public key stored in the circuitry 213 may be used to verify the RSB 220. The encrypted key deriver 211 may then retrieve the delegate public key from the RSB 220. Furthermore, the encrypted key deriver 211 may generate a derived key based on a combination of the delegate public key and the base symmetric key retrieved from the OTP memory 212. Further details with regard to generating the derived key are disclosed in conjunction with FIGS. 3-10.

The derived key generated by the encrypted key deriver 211 may then be transmitted to the delegate entity (e.g., after being encrypted by the delegate public key). In response, the delegate entity may transmit a subsequent delegate signed block 230 to the device 200 which may use the previously generated derived key. Subsequently, the same derived key may be used to verify the DSB 230 by using the derived key.

Figure 3:
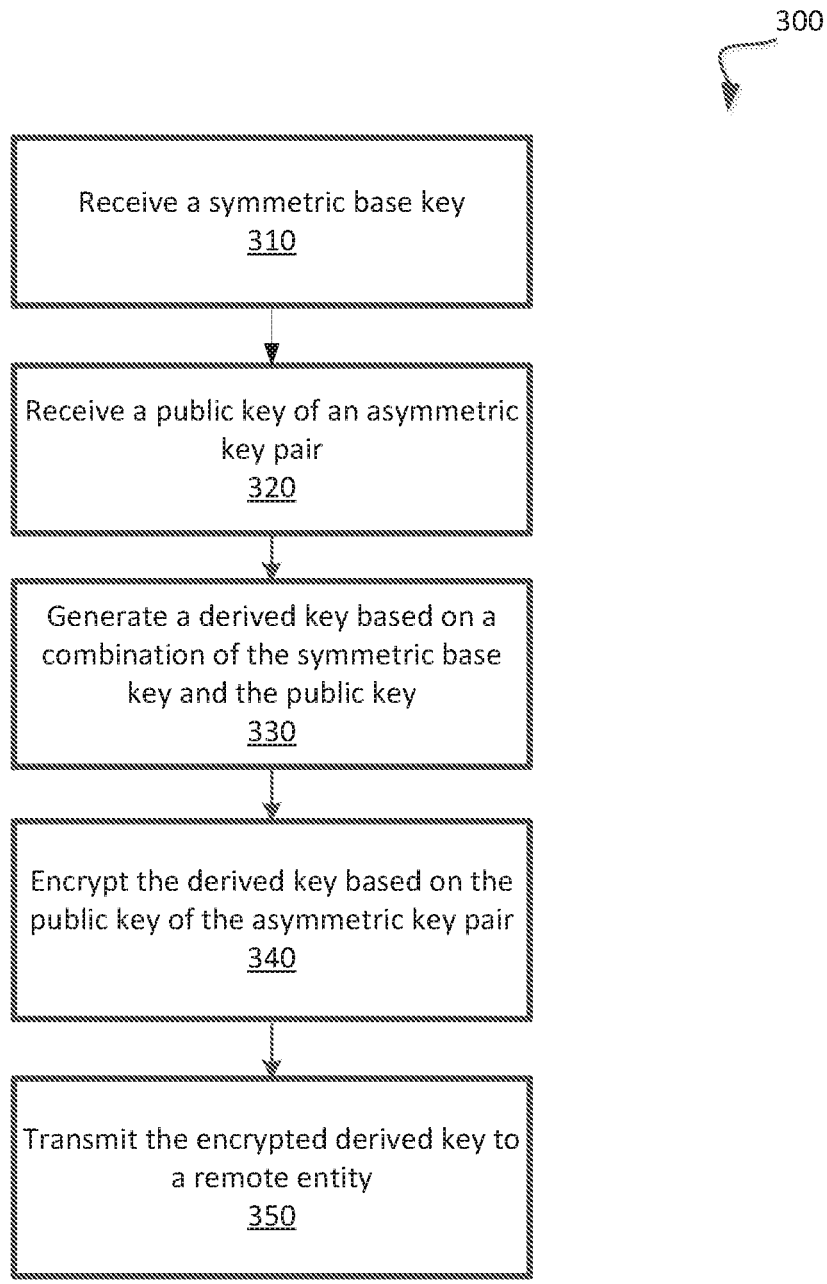
FIG. 3 is a flow diagram of an example method to generate and encrypt a derived key in accordance with some embodiments of the present disclosure.

FIG. 3 is a flow diagram of an example method 300 to generate and encrypt a derived key. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the encrypted key deriver 140 or 211 of FIG. 1 or 2.

As shown in FIG. 3, the method 300 may begin with the processing logic receiving a symmetric base key (block 310). For example, a symmetric base key may be retrieved from an OTP memory of a device. The processing logic may further receive a public key of an asymmetric key pair (block 320). For example, a public key of a public-private key pair may be received. In some embodiments, the received public key may be received from a root signed block that is transmitted to the device from a delegate entity. Further details with regard to the root signed block and the receiving of the public key from the root signed block are disclosed in conjunction with FIGS. 5 and 6. The processing logic may generate a derived key based on a combination of the symmetric base key and the public key (block 330). For example, a one way function may be used to generate the derived key based on the symmetric base key and the public key. Further details with regard to the one way function are disclosed in conjunction with FIGS. 7-9. The processing logic may encrypt the derived key based on the public key of the asymmetric key pair (block 340). For example, the derived key may be encrypted by the same public key retrieved from the root signed block that was previously used to generate the derived key. Furthermore, the processing logic may transmit the encrypted derived key to a remote entity (block 350). For example, the encrypted derived key may be transmitted to the delegate entity that transmitted the root signed block to the device.

As such, a derived key may be based on a combination of a symmetric base key stored in an OTP memory of a device and a public key that is an asymmetric key that is received from a delegate entity. The derived key may then be encrypted by the same public key.

Figure 4:
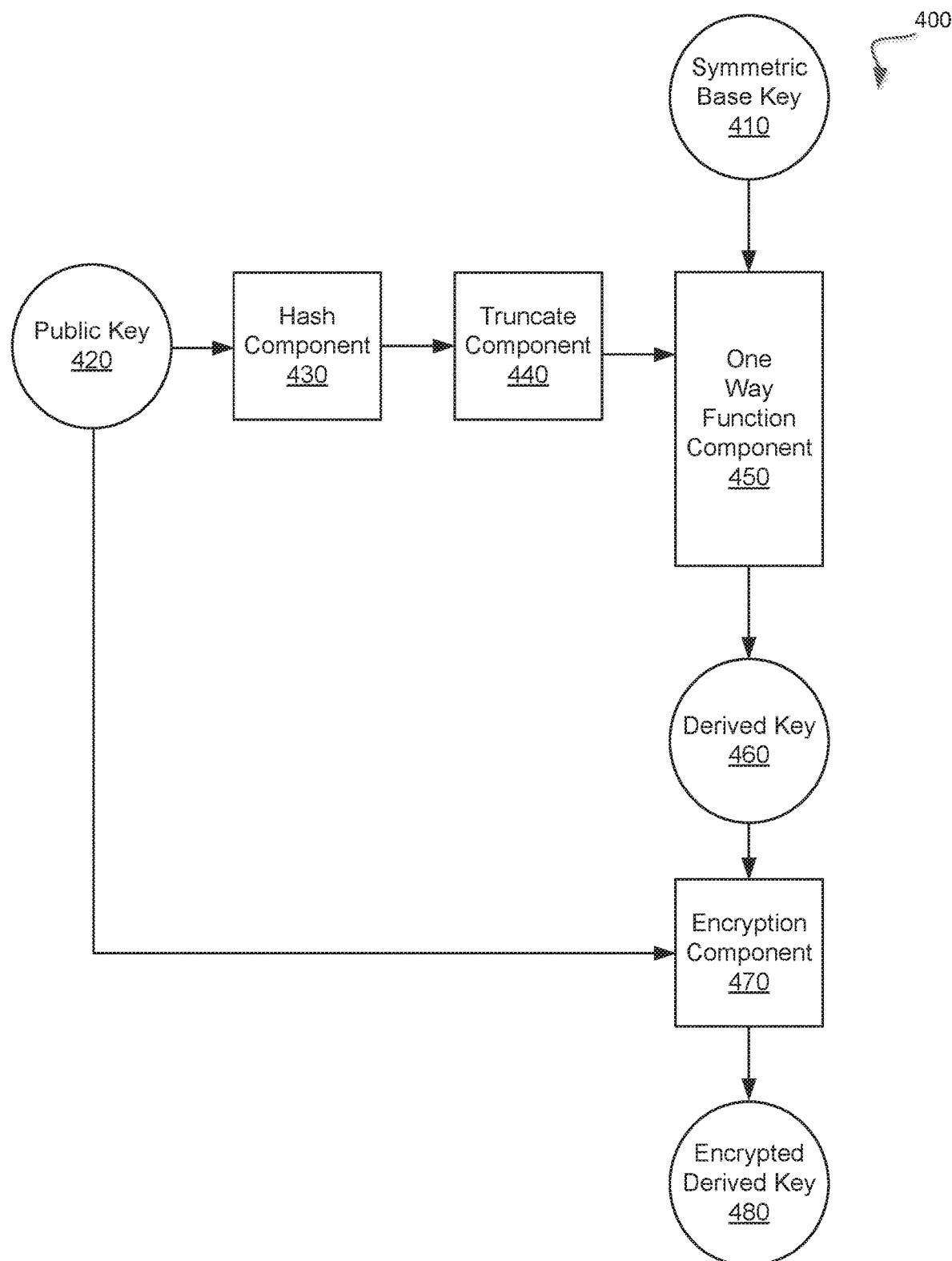
FIG. 4 is a block diagram of an example architecture to generate and encrypt a derived key in accordance with some embodiments.

FIG. 4 is a block diagram of an example architecture 400 to generate and encrypt a derived key. In general, the architecture 400 may be based on hardware (e.g., processing device, circuitry, dedicated logic, programmable logic, microcode, hardware of a device, integrated circuit, etc.), software (e.g., instructions run or executed on a processing device), or a combination thereof. In some embodiments, the architecture 400 may correspond to the encrypted key deriver 140 or 211 of FIG. 1 or 2.

As shown in FIG. 4, the architecture 400 may include a one way function component 450 that may perform a one way function. An example of a one way function may be a key tree as described in further detail with regard to FIGS. 8-9. Alternatively, the one way function may be, but is not limited to, a hash function such as a Secure Hash Algorithm (SHA), an Advanced Encryption Standard (AES) function, or a keyed-hash message authentication code (HMAC) function. The one way function component 450 may perform the one way function based on the symmetric base key 410 that is received from an OTP memory of a device that includes the architecture 400 and the public key 420 or a portion of the public key 420. For example, the public key 420 (which may correspond to a public key of a public-private asymmetric key pair) may be received by the hash component 430 that may perform a hash function on the public key 420. In some embodiments, the hash function may map digital data (e.g., the public key 420) to digital data of another size (e.g., a hash value). For example, the hash component 430 may receive the public key 420 and may perform a hash function (e.g., an SHA function) to generate a hash value at 256 bits. Furthermore, a truncate component 440 may truncate the hash value that has been generated by the hash component 430. For example, the least 32 significant bits or the most significant 32 bits, or any combination of 32 bits (or any such number of bits) may be selected from the hash value as another input to the one way function component 450. As such, the one way function component 450 may generate the derived key 460 based on a combination of the symmetric base key 410 and a portion of a hash value corresponding to the public key 420. In some embodiments, the derived key 460 is a symmetric key.

Referring to FIG. 4, an encryption component 470 may receive the derived key 460 as well as the public key 420 and may perform an encryption operation to generate an encrypted derived key 480. The encryption operation performed by the encryption component 470 may include, but is not limited to, an elliptic curve cryptographic (ECC) operation, an RSA operation, or any other cryptographic operation corresponding to a public-key cryptosystem.

Figure 5:
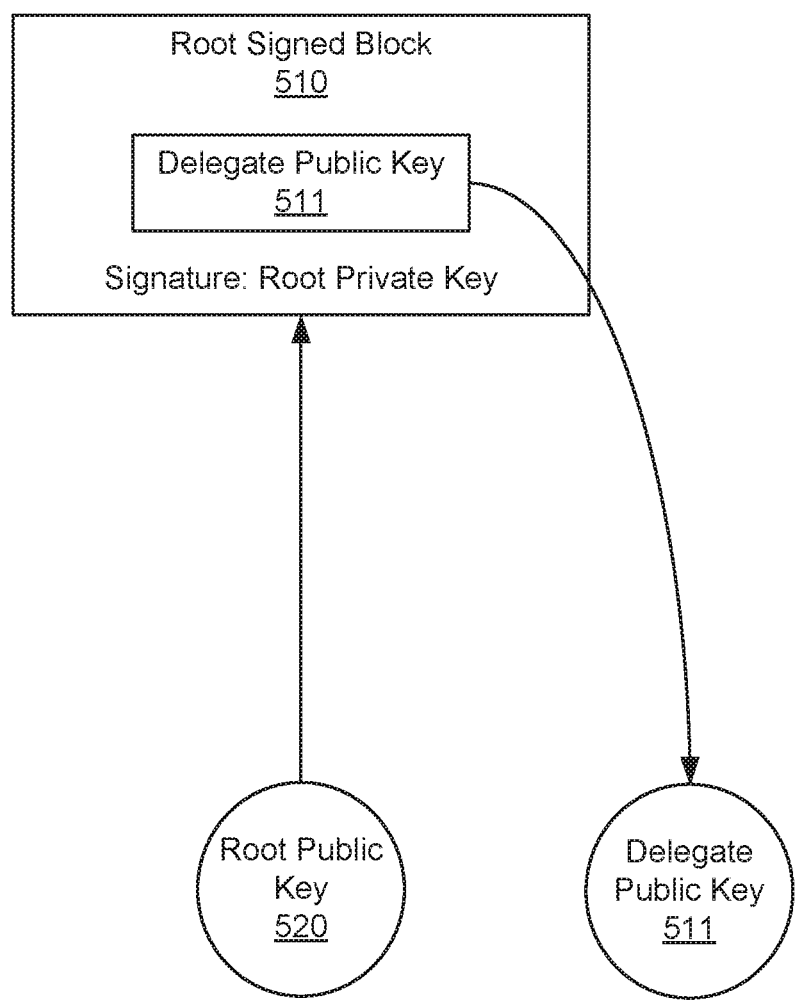
FIG. 5 illustrates an example of a delegate public key being retrieved from a root signed block in accordance with some embodiments.

FIG. 5 illustrates an example of a delegate public key being retrieved from a root signed block. In general, the root signed block 510 may correspond to the root signed block 220 of FIG. 2. In some embodiments, the root signed block 510 may be received by an encrypted key deriver 140 or 211 of FIG. 1 or 2.

As shown in FIG. 5, the root signed block 510 (which may also be referred to as a root signed message) may include a delegate public key 511. Furthermore, the root signed block 510 may be signed by a root private key. As previously described, a device that includes the encrypted key deriver that receives the root signed block 510 may store a root public key 520 in circuitry of the device. The root public key 520 may be mathematically linked or correspond to the root private key that was used to sign the root signed block 510. For example, the root public key 520 may verify the root signed block 510 that was verified by the root private key. Once the root public key 520 is used to verify (e.g., verify a signature generated by the root private key) the root signed block 510, the delegate public key 511 may be retrieved from the root signed block 510. Subsequently, a derived key may be generated by using the delegate public key 511 and a base symmetric key as previously described.

Figure 6:
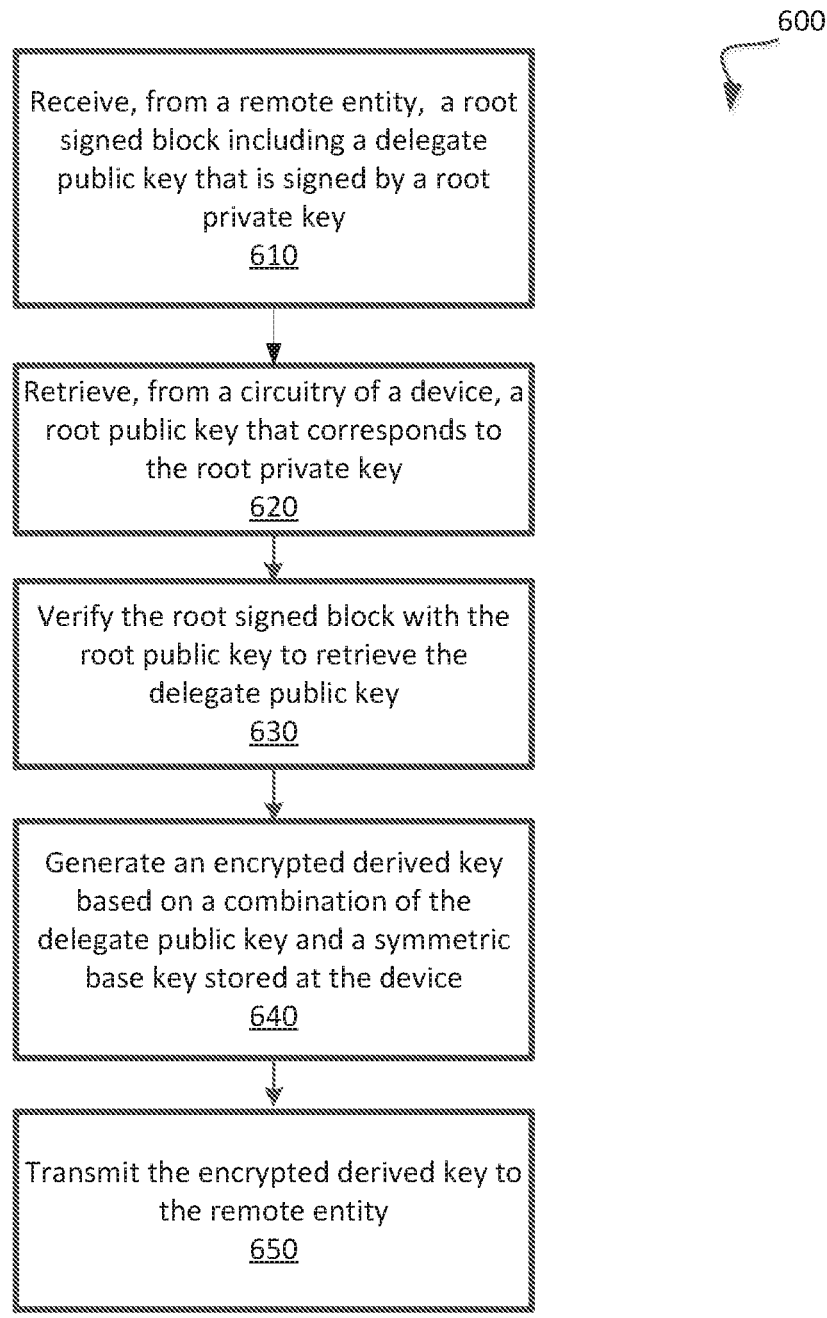
FIG. 6 is a flow diagram of an example method to generate and encrypt a derived key from a delegate public key retrieved from a root signed block in accordance with some embodiments.

FIG. 6 is a flow diagram of an example method 600 to generate and encrypt a derived key from a delegate public key retrieved from a root signed block. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the encrypted key deriver 140 or 211 of FIG. 1 or 2.

As shown in FIG. 6, the method 600 may begin with the processing logic receiving, from a remote entity, a root signed block that includes a delegate public key that is signed by a root private key (block 610). The processing logic may retrieve, from circuitry of a device, a root public key that corresponds to the root private key (block 620). Furthermore, the root signed block may be or verified with the root public key to retrieve the delegate public key (block 630). For example, the delegate public key may be retrieved from the root signed block after the verification of a digital signature of the root signed block. The processing logic may further generate an encrypted derived key based on a combination of the delegate public key and a symmetric base key that is stored at the device (block 640). For example, the derived base key may be generated and subsequently encrypted based on a combination of the delegate public key retrieved from the root signed block and the base symmetric key stored in an OTP memory of the device as previously described. The processing logic may then transmit the encrypted derived key to the remote entity (block 650). For example, the encrypted derived key may be transmitted to the delegate entity that has transmitted the root signed block to the device.

Figure 7:
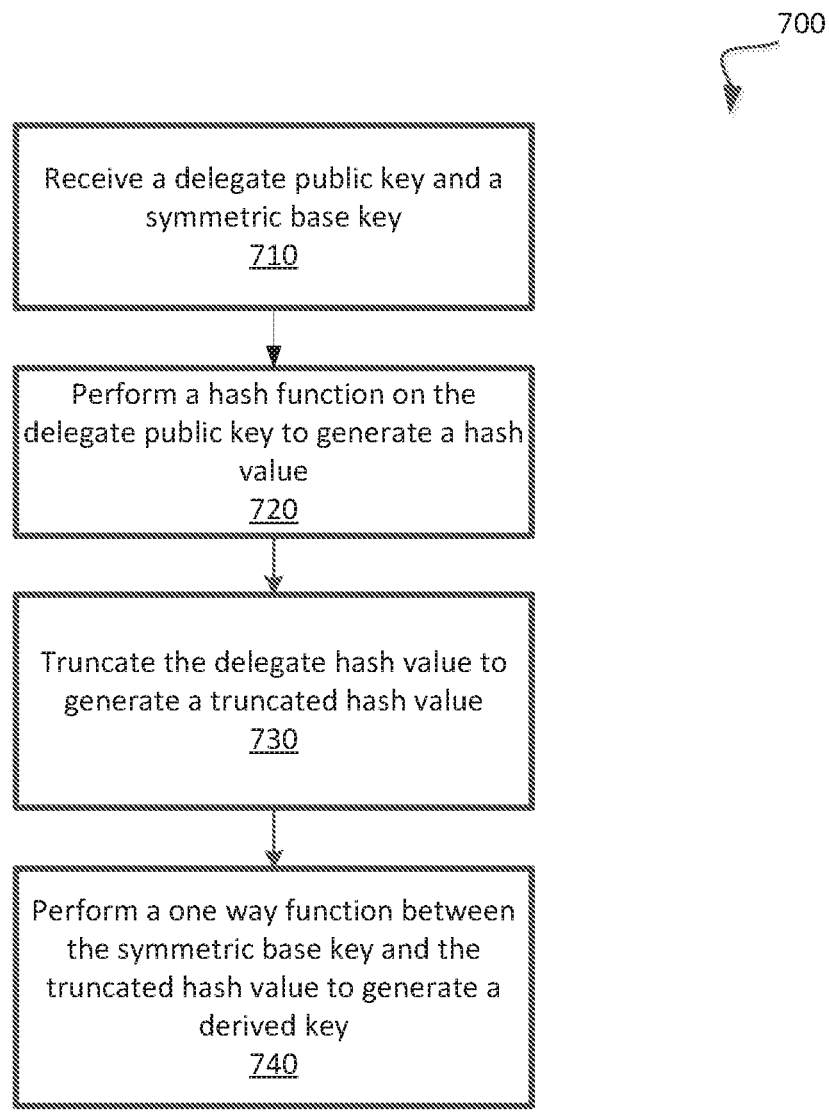
FIG. 7 is a flow diagram of an example method to perform a one way hash function to generate a derived key in accordance with some embodiments.

FIG. 7 is a flow diagram of an example method 700 to perform a one way hash function to generate a derived key. In general, the method 700 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 may be performed by the encrypted key deriver 140 or 211 of FIG. 1 or 2.

As shown in FIG. 7, the method 700 may begin with the processing logic receiving a delegate public key and a symmetric base key (block 710). For example, the delegate public key may be received from a root signed block and the symmetric base key may be received from an OTP memory. The processing logic may perform a hash function on the delegate public key to generate a hash value (block 720). The hash function may be, but is not limited to, a Secure Hash Algorithm (SHA). For example, the hash function may be an SHA-256 algorithm. Furthermore, the processing logic may truncate the hash value to generate a truncated hash value (block 730). For example, the hash value may be a particular number of bits (e.g., 256 bits) and a portion of the number of bits of the hash value (e.g., 32 bits) may be selected as the truncated hash value. The bits that are selected may be the least significant bits of the hash value, the most significant bits of the hash value, or a combination of various bits of the hash value. The processing logic may subsequently perform a one way function between the symmetric base key and the truncated hash value to generate a derived key (block 740). An example of the one way function is a key tree function as described in further detail with regard to FIGS. 8 and 9.

As such, the derived key may be generated by using a one way function with inputs being the symmetric base key and at least a portion of a hash value corresponding to the delegate public key. In alternative embodiments, the derived key may be generated by using the one way function with inputs being the symmetric base key and the delegate public key (e.g., without any hash function or truncation function being performed).

Figure 8:
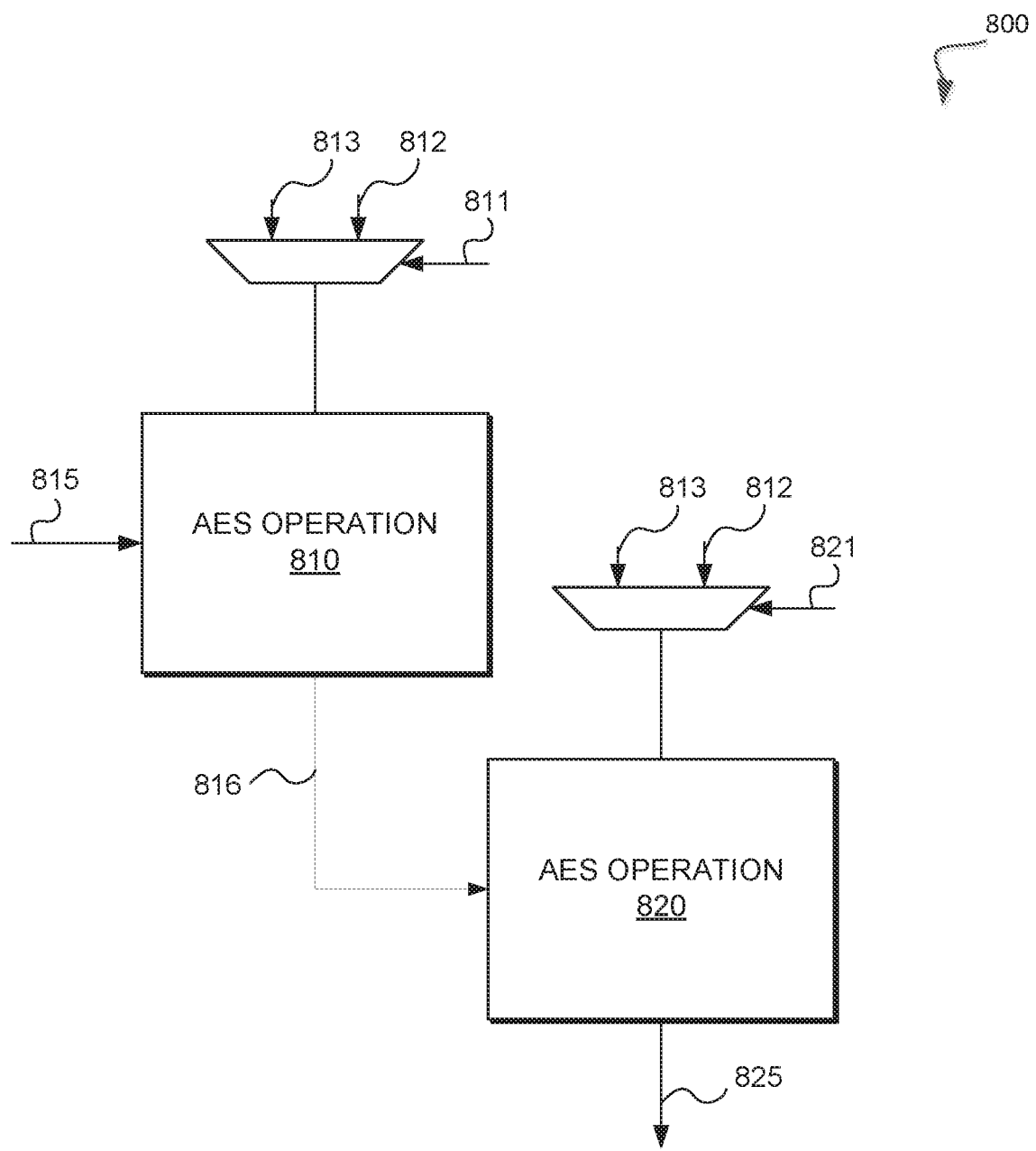
FIG. 8 illustrates example operations of a key tree in which some embodiments of the disclosure may operate.

FIG. 8 illustrates example operations 800 of a key tree. In general, the operations 800 may correspond to operations of the one way function component 450 of FIG. 4. The operations 800 may receive a first input (e.g., the base symmetric key) and a second input (e.g., the delegate public key or a truncated portion of a hash value corresponding to the delegate public key) and produce a derived key.

As shown in FIG. 8, the operations 800 may include an AES operation 810 and an AES operation 820. Although the operations are described as AES operations, any type of cryptographic operation may be used. In some embodiments, the AES operation 810 and the AES operation 820 may be performed by a single component performing one of the AES operations 810 and 820 for each cycle. The first AES operation 810 may receive an input 815 corresponding to the base symmetric key and a another input corresponding to an output from a selection unit 814 (e.g., a multiplexer). The selection unit may select one of the inputs 813 or 812 as an output signal to be used as another input to the AES operation 810 based on a selection signal 811. In some embodiments, the selection signal 811 may be a value based on the delegate public key (e.g., the delegate public key itself, a hash value of the delegate public key, or the truncated portion of a hash value corresponding to the delegate public key). For example, the selection signal 811 may be the least significant bit of the value that is based on the delegate public key. The value of the selection signal 811 may be used to select one of the inputs 812 or 813 as an input to the AES operation 810. For example, if the selection signal 811 is at a first value then the input signal 813 may be used as an input to the AES operation 810 and if the selection signal 811 is at a second value that is different than the first value then the input signal 812 may be used as an input to the AES operation 810. Thus, the AES operation 810 may generate an output 816 that may correspond to an intermediate key that is based on a combination of the base symmetric key (e.g., the input 815) and a value (e.g., the input 813 or the input 812) that is selected based on a value of one bit of the value that is based on the delegate public key.

For a second cycle, a subsequent AES operation 820 may be performed. For example, the output 816 from the AES operation 810 may be received as an input for the subsequent AES operation 820. Similarly, one of the inputs 812 or 813 may be selected as another input to the AES operation 820 based on the selection signal 821. In some embodiments, the selection signal 821 may be the second least significant bit of the value that is based on the delegate public key. The AES operation 820 may thus generate another key 825 based on a combination of the output 816 from the first AES operation 810 and the input 812 or 813 selected from the second least significant bit of the value that is based on the delegate public key.

In some embodiments, the number of AES operations performed may correspond to the number of bits of the value that is based on the delegate public key. For example, if the number of bits corresponds to 32 bits, then 32 AES operations may be performed. The first operation may select one of the inputs 812 or 813 based on the least significant bit of the value that is based on the delegate public key, the second operation may select one of the inputs 812 or 813 based on the second least significant bit, and so forth until the final AES operation selects one of the inputs 812 or 813 based on the most significant bit of the value that is based on the delegate public key. Thus, the final AES operation may generate the derived key from a combination of the output of the second to last AES operation and an input 812 or 813 that is selected based on the most significant bit of the value that is based on the delegate public key.

Figure 9:
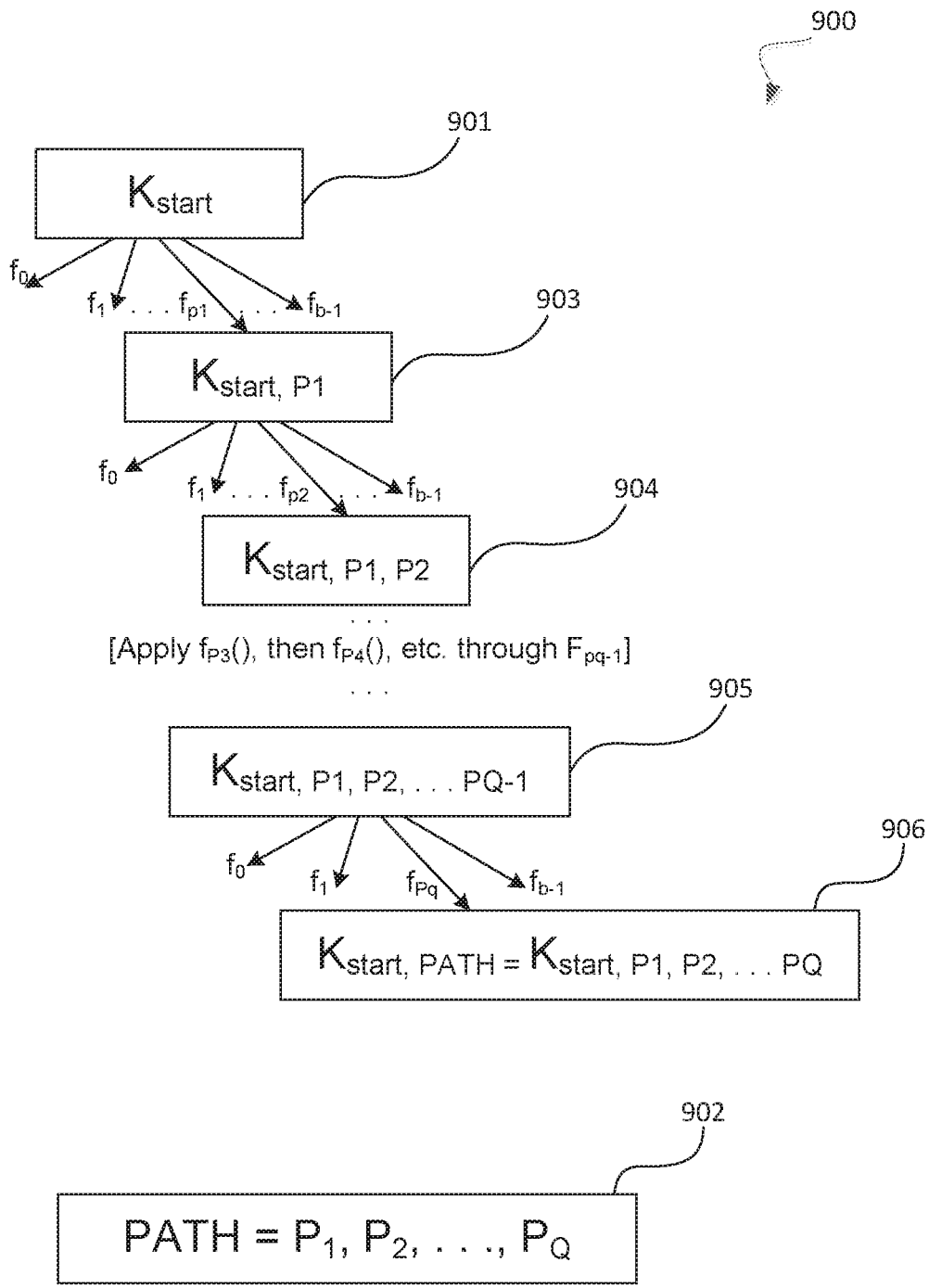
FIG. 9 is a block diagram of an example key tree in which some embodiments of the disclosure may operate.

FIG. 9 is a block diagram of an example key tree 900. In general, the key tree 900 may correspond to the one way function component 450 of FIG. 4. The key tree 900 may receive a first input (e.g., the base symmetric key) and a second input (e.g., the delegate public key or a truncated portion of a hash value corresponding to the delegate public key) and produce a derived key.

In some embodiments, the key tree 900 may perform an entropy redistribution operation. As used herein, an "entropy redistribution operation" (or "entropy distribution operation") may be an operation that mixes its input(s) (e.g., the base symmetric key and a value based on the delegate public key) such that unknown information about input bits is redistributed among the output bits. For example, suppose an x bit cryptographic key $K_0$ is processed repeatedly with an entropy redistribution operation f such that key $K_i=f(K_{i-1})$ for each i>1. Next, suppose an adversary obtains y bits of information (e.g., obtained as part of an attempted external monitoring attack) about each of n different keys $K_i$, providing more than enough information to solve for key $K_0$ (e.g., y*n>x). The use of the entropy distribution operation may make such solution computationally infeasible. A cryptographic hash function H is an example of an operation that may be used as an entropy redistribution operation. For example, consider a strong hash function H that produces a 256-bit result. Given a random 256-bit initial key $K_0$, let $K_i=H(K_{i-1})$ for each i>1. An adversary with knowledge of (for example) the least-significant bit of each $K_0 \ldots K_{999,999}$ has 1,000,000 bits of data related to $K_0$. A hypothetical adversary with infinite computing power could find $K_0$ by testing A possible $2^{156}$ values for $K_0$ to identify a value which is consistent with the known sequence of least-significant bits. Actual adversaries have finite computational power available, however, and the entropy redistribution operation prevents there from being a computationally practical way to solve for $K_0$ (or any other $K_i$) given the information leaked through attempted external monitoring attacks.

Entropy redistribution operations may be implemented, without limitation, using cryptographic hash functions, operations constructed using block ciphers (such as AES), pseudorandom transformations, pseudorandom permutations, other cryptographic operations, or combinations thereof. Embodiments are described with respect to a hash, but those skilled in the art will understand that, pursuant to the foregoing, other entropy redistribution functions may also be used instead or in addition.

Multiple entropy redistribution operations may also be constructed from a base operation. By way of example, 256-bit entropy redistribution operations $f_0()$ and $f_i()$ are required, $f_0()$ could comprise applying the SHA-256 cryptographic hash function to the operation identifier string "f0" concatenated with the input to $f_0()$ while $f_1()$ could comprise applying SHA-256 to the operation identifier string "f1" concatenated with the input to $f_1()$ Entropy redistribution operations can be construed using the well-known AES block cipher. For example, to implement $f_0() \ldots f_{b-1}()$ each $f_i()$ can use its input as an AES-256 key to encrypt a pair of 128-bit input blocks that are unique to the choice of i within $0 \ldots b-1$, yielding 256 bits of output.

The key tree 900 may be able to compute a set of non-linear cryptographic entropy redistribution operations $f_0(), f_1(), \ldots f_{b-1}()$, where b>1 is a positive integer. These b entropy redistribution functions can be configured in a tree structure. For example, a simple b-ary tree structure of height Q (i.e., having Q+1 levels, from 0 through Q) can be created by using b distinct entropy distribution functions, $f_0() \ldots f_{b-1}()$ to represent the b possible branches of this b-ary tree each node of the tree, each node representing a possible derived base key. In such a tree, starting from a root cryptographic key $K_{START}$ (which is at level 0), b possible derived base keys can be computed at level 1: $f_0(K_{START})$ for the leftmost branch; $f_1(K_{START})$ for the next branch; and continuing until $f_{b-1}(K_{START})$ for the rightmost branch. At level 2, $b^2$ possible keys can be derived, since each of $f_0() \ldots f_{b-1}()$ could be applied to each of the b possible level 1 keys. Computing a specific level 2 node may require not $b^2$, computations (i.e., the nodes not on the path are not computed). The tree continues for successive levels 1 through Q, where each possible key (i.e., a different node) of a prior level can be processed by applying $f_0() \ldots f_{b-1}()$ in turn to derive b additional possible derived base keys. The entire key tree has Q+1 levels, starting with a single node at level 0, continuing with $b^i$ nodes at level i, and ending with $b^Q$ nodes at level Q. Thus, there are $b^Q$ possible paths from the root node at level 0 to the $b^Q$ final nodes at level Q. Each such possible path, corresponding to a unique the sequence of functions applied at the different levels, can be represented as a sequence of Q integers, each integer being selected from $(0 \ldots b-1)$. For example, in an exemplary embodiment, b=2. Thus, two entropy redistribution operations, $f_0()$ and $f_1()$ are used (and may be constructed from a base operation, e.g., as described above). If Q=128 (i.e., the height is 128), $2^{128}$ paths are possible and 128 entropy redistribution function computations are required to derive the level Q key from the level 0 node (i.e., the starting key).

As a variation, embodiments may involve more variety in the choice of b, such as varying the value of b among levels, and/or varying b based on the route taken to a particular level. Likewise, the entropy redistribution operations can also be varied, such as by making the entropy redistribution operations $f_i()$ differ at different levels or making these operations depend on the sequence taken to a particular level.

An example key derivation process is diagrammed in FIG. 9. The process begins with a starting point of the tree, which is denoted $K_{START}$ (901), and a path $P_1 \ldots P_Q$ (902). For example, $K_{START}$ may the value of the base symmetric key and path $P_1 \ldots P_Q$ (902) may be the value based on the delegate public key (e.g., the delegate public key or a truncated portion of the hash value of the delegate public key). The conversion of entity ID into $P_1 \ldots P_Q$ is discussed below. The path specifies a succession of entropy redistribution operations to be applied to $K_{START}$.

In an implementation, entity ID $H_1$ is decomposed into Q parts $P_1, P_2, \ldots P_Q$. In an example decomposition, each part $P_i$ is all integer from 0 thru (b−1) (e.g., if b=4 then each $P_i$ is a two-bit value (0, 1, 2, or 3)). Likewise, if b=2, each $P_1$ is a single bit (0 or 1). Hence, the path parts $P_1 \ldots P_Q$ can be used to specify a specific path from $K_{START}$ to $K_{START, PATH}$ by applying functions $f_0(), f_1() \ldots f_{b-1}()$ to produce a plurality of intermediate keys leading to $K_{START, PATH}$ as follows. First, the function $f_{P\,1}$ is applied to $K_{START}$ (903) to yield an intermediate key $K_{START,P\,1}$, followed by the application of $f_{P\,2}$ on $K_{START,P\,1}$ to yield the intermediate key $K_{START,P\,1,P\,2}$ (904) and so on, until the final application of $f_{P\,Q}$ on the intermediate key $K_{START,P\,1,P\,2,\ldots,P\,Q-1}$ (905) to yield the final derived base key, $K_{START,P\,1,P\,2,\ldots P\,Q}$ (906). Note that the derivation of each intermediate key depends on at least one predecessor key and the relevant portion of the message identifier. For convenience, this final derived key may be denoted with the notation $K_{START,PATH}$ (indicating the key that was reached by starting with $K_{START}$ and following PATH).

Figure 10:
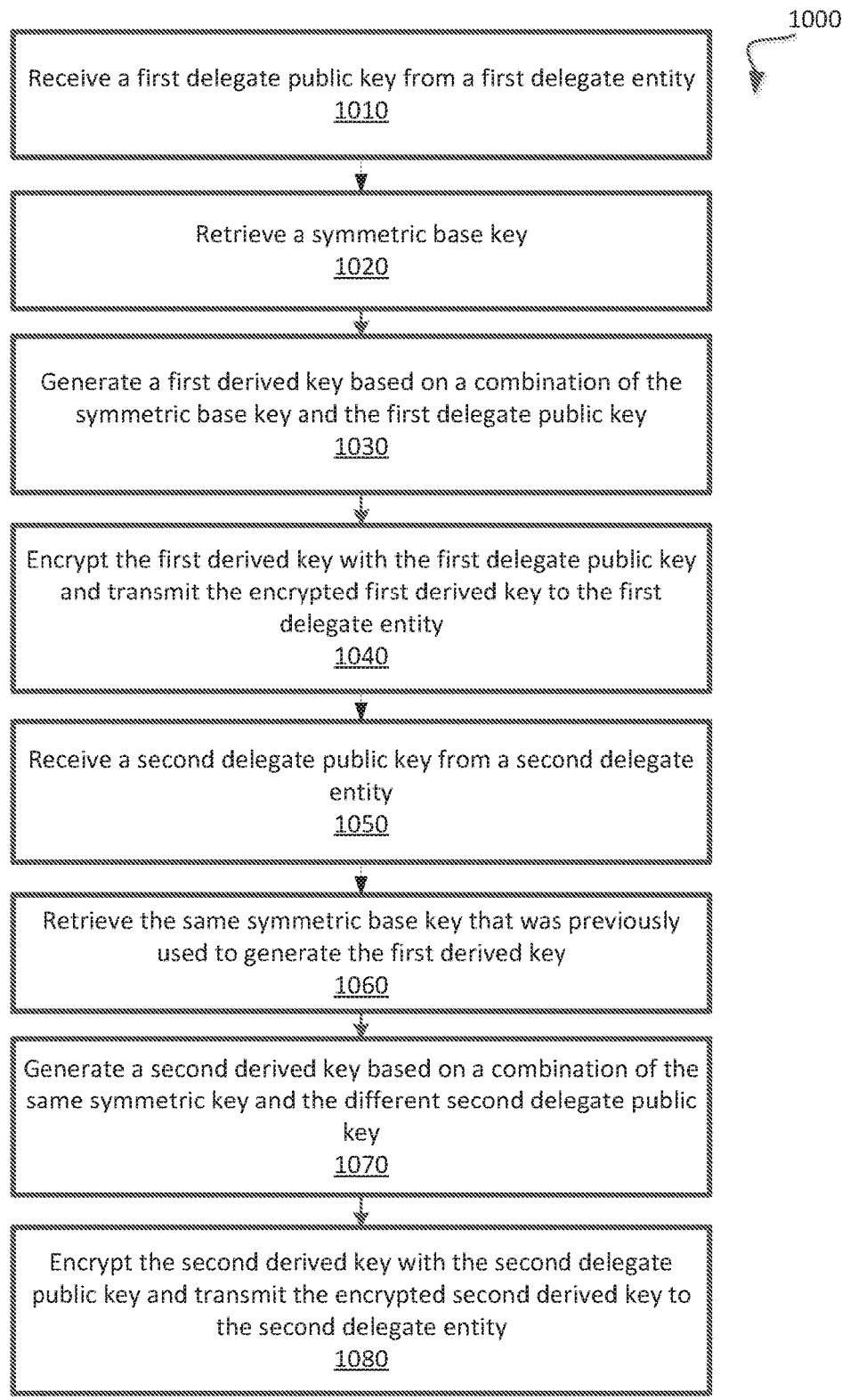
FIG. 10 illustrates an example method to generate different derived keys based on different public keys in accordance with some embodiments of the present disclosure.

FIG. 10 illustrates an example method to generate different derived keys based on different public keys. In general, the method 1000 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 may be performed by the encrypted key deriver 140 or 211 of FIG. 1 or 2.

As shown in FIG. 10, the method 1000 may begin with the processing logic receiving a first delegate public key (block 1010). For example, the first delegate public key may be retrieved from a first root signed block transmitted by a first delegate entity to a device. The processing logic may further retrieve a symmetric base key (block 1020). For example, the symmetric base key may be retrieved from an OTP memory of the device in response to receiving the first root signed block from the first delegate entity. Subsequently, the processing logic may generate a first derived key based on a combination of the symmetric base key and the first delegate public key (block 1030). The first derived key may then be encrypted by the first delegate public key and transmitted to the first delegate entity (block 1040). At a second time after receiving the first delegate public key, the processing logic may receive a second delegate public key (block 1050). For example, the second delegate public key may be retrieved from a second root signed block that is transmitted by a second delegate entity to the same device.

The processing logic may then retrieve the same symmetric base key that was previously used to generate the first derived key (block 1060). Furthermore, the processing logic may generate a second derived key based on a combination of the same symmetric base key and the different second delegate public key (block 1070). The second derived key may then be encrypted by the second delegate public key and transmitted to the second delegate entity (block 1080).

As such, different delegate entities may transmit different public keys to the device. Different derived keys may be generated for each of the different delegate entities based on the same symmetric base key and the corresponding delegate public key that is received.

Figure 11:
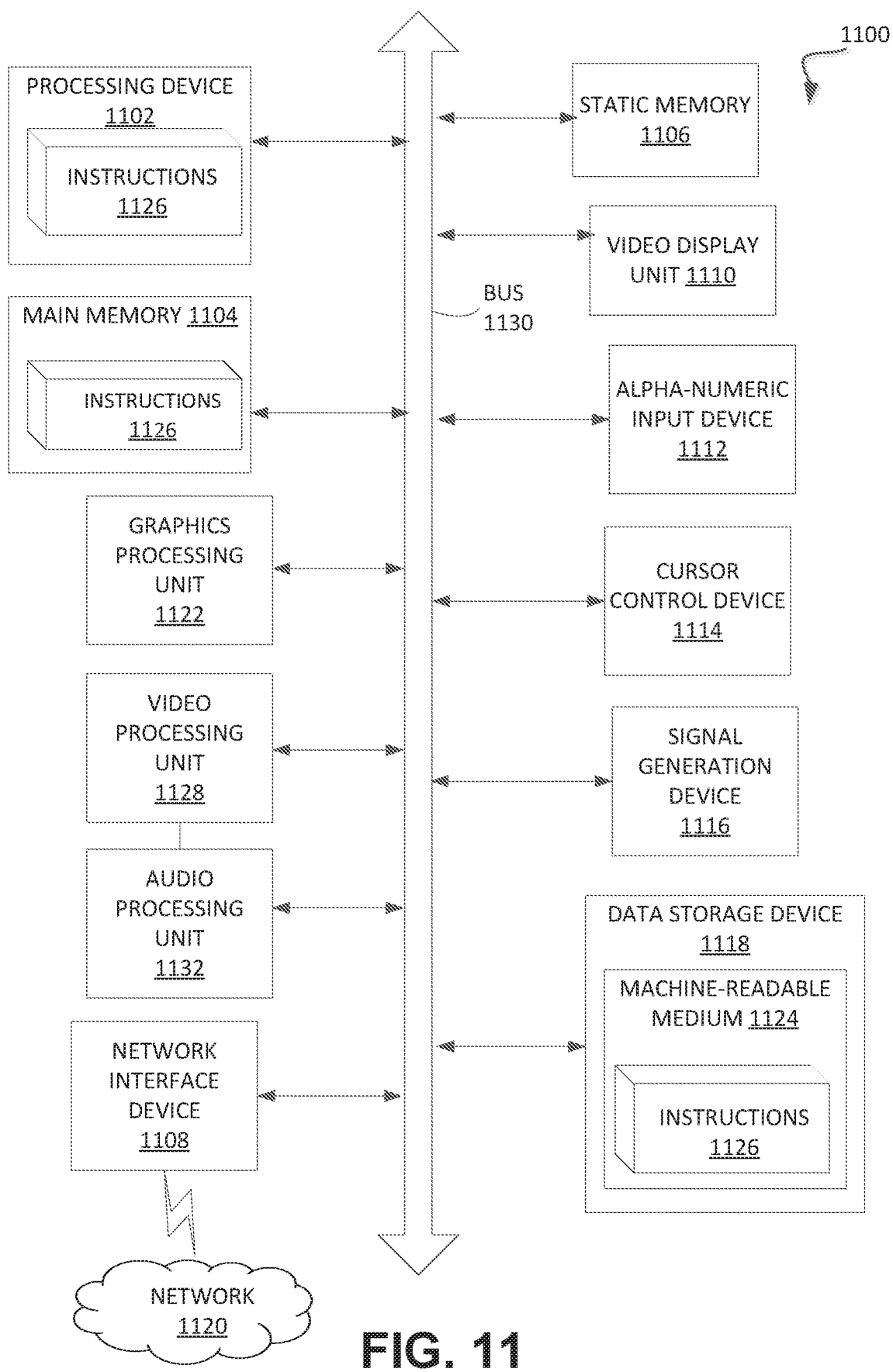
FIG. 11 illustrates a block diagram of an embodiment of a computer system in which some embodiments of the disclosure may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1126 include instructions to implement functionality corresponding to an encrypted key deriver (e.g., encrypted key deriver 140 or 211 of FIG. 1 or 2). While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   storing a base key at a device, wherein the base key is private to the device;
   receiving a message from a remote entity, the message including a signature of a root entity that is based on a root private key;
   verifying the signature of the root entity from the message with a root public key that corresponds to the root private key;
   responsive to verifying the signature of the root entity from the message, receiving, at the device, a public key of the remote entity that is included in the message, wherein the public key is an asymmetric key;
   generating, by a processing device of the device, a derived key using a one way function having the base key as a first input and a second input that is based on the public key of the remote entity that is included in the message; and
   encrypting the derived key by using the same public key that is used to generate the derived key.

2. The method of claim 1, further comprising:
   transmitting the encrypted derived key to the remote entity.

3. The method of claim 1, further comprising:
   receiving a second public key from a second remote entity;
   generating a second derived key based on the one way function between the same base key that is stored at the device and the second public key that is received from the second remote entity;
   encrypting the second derived key based on the second public key; and
   transmitting the encrypted second derived key to the second remote entity.

4. The method of claim 1, wherein the root public key is stored in circuitry of the device.

5. The method of claim 1, wherein the generating of the derived key comprises:
   generating a hash value of the public key; and
   truncating the hash value of the public key to generate a truncated hash value, wherein the truncated hash value is the second input, wherein the one way function generates the derived key based on the truncated hash value of the public key and the base key.

6. The method of claim 1, wherein the generating of the derived key comprises:
   performing a first operation to generate an intermediate key based on a combination of the base key and a bit of a value that is based on the public key, wherein the intermediate key is the second input; and
   performing a second operation to generate the derived key based on a combination of the intermediate key and another bit of the value that is based on the public key.

7. A method comprising:
   storing a base key at a device, wherein the base key is private to the device;
   receiving a message from a remote entity, the message including a signature of a root entity that is based on a root private key;
   verifying the signature of the root entity from the message with a root public key that corresponds to the root private key;
   responsive to verifying the signature of the root entity from the message, receiving, at the device, a public key of the remote entity that is included in the message, wherein the public key is an asymmetric key;
   generating, by a processing device of the device, a derived key based on a one way function between the base key that is stored at the device and the public key of the remote entity that is included in the message; and
   encrypting the derived key by using the same public key that is used to generate the derived key, wherein the generating of the derived key is based on the one way function between the base key and the public key comprises:
   performing a first operation to generate an intermediate key based on a combination of the base key and a bit of a value that is based on the public key; and
   performing a second operation to generate the derived key based on a combination of the intermediate key and on the public key.

8. A method comprising:
   storing a base key at a device, wherein the base key is private to the device;
   receiving a message from a remote entity, the message including a signature of a root entity that is based on a root private key;
   verifying the signature of the root entity from the message with a root public key that corresponds to the root private key;
   responsive to verifying the signature of the root entity from the message, receiving, at the device, a public key of the remote entity that is included in the message, wherein the public key is an asymmetric key;

generating, by a processing device of the device, a derived key based on a one way function between the base key that is stored at the device and the public key of the remote entity that is included in the message; and encrypting the derived key by using the same public key that is used to generate the derived key, wherein the generating of the derived key based on the one way function between the base key and the public key comprises:

generating a hash value of the public key; and truncating the hash value of the public key to generate a truncated hash value, wherein the one way function generates the derived key based on the truncated hash value of the public key and the base key.

9. A system comprising:

a memory storing a base key, wherein the base key is private to the system; and a processing device operatively coupled to the memory, the processing device to:

receive the base key that is stored at the memory;

receive a message from a remote entity, the message including a signature of a root entity that is based on a root private key;

verify the signature of the root entity from the message with a root public key that corresponds to the root private key;

responsive to verifying the signature of the root entity from the message, receive a public key of the remote entity that is included in the message;

generate a derived key using a one way function having the base key as a first input and a second input that is based on the public key of the remote entity that is included in the message; and encrypt the derived key by using the same public key that is used to generate the derived key.

10. The system of claim 9, wherein the processing device is further to:

transmit the encrypted derived key to the remote entity, wherein the derived key is a symmetric key.

11. The system of claim 9, wherein the processing device is further to:

receive a second public key from a second remote entity, wherein the second public key is different than the public key of the remote entity;

generate a second derived key based on the one way function between the same base key that is stored at the memory and the second public key that is received from the second remote entity;

encrypt the second derived key based on the second public key; and transmit the encrypted second derived key to the second remote entity.

12. The system of claim 9, wherein the generating of the derived key based on the one way function comprises:

performing a first operation to generate an intermediate key based on a combination of the base key and a bit of a value that is based on the public key, wherein the intermediate key is the second input; and performing a second operation to generate the derived key based on a combination of the intermediate key and another bit of the value that is based on the public key.

13. The system of claim 12, wherein the first operation and the second operation each correspond to an Advanced Encryption Standard (AES) operation.

14. The system of claim 9, wherein the generating of the derived key based on the one way function between the base key and the public key comprises:

generating a hash value of the public key; and truncating the hash value of the public key to generate a truncated hash value, wherein the truncated hash value is the second input, wherein the one way function generates the derived key based on the truncated hash value of the public key and the base key.

15. A non-transitory computer readable medium including data that, when accessed by a processing device, cause the processing device to perform operations comprising:

storing a base key at a device, wherein the base key is private to the device;

receiving a message from a remote entity, the message including a signature of a root entity that is based on a root private key;

verifying the signature of the root entity from the message with a root public key that corresponds to the root private key;

responsive to verifying the signature of the root entity from the message, receiving, at the device, a public key from of the remote entity that is included in the message, wherein the public key is an asymmetric key;

generating a derived key using a one way function having the base key as a first input and a second input that is based on the public key of the remote entity that is included in the message; and encrypting the derived key by using the same public key that is used to generate the derived key.

16. The non-transitory computer readable medium of claim 15, wherein the operations further comprise:

transmitting the encrypted derived key to the remote entity.

17. The non-transitory computer readable medium of claim 15, wherein the operations further comprise:

receiving a second public key from a second remote entity;

generating a second derived key based on the one way function between the same base key that is stored at the device and the second public key that is received from the second remote entity;

encrypting the second derived key based on the second public key; and transmitting the encrypted second derived key to the second remote entity.

18. The non-transitory computer readable medium of claim 15, wherein the generating of the derived key based on the one way function between the base key and the public key comprises:

performing a first operation to generate an intermediate key based on a combination of the base key and a bit of a value that is based on the public key, wherein the intermediate key is the second input; and performing a second operation to generate the derived key based on a combination of the intermediate key and another bit of the value that is based on the public key.

19. The non-transitory computer readable medium of claim 15, wherein the generating of the derived key based on the one way function between the base key and the public key comprises:

generating a hash value of the public key; and
    truncating the hash value of the public key to generate a truncated hash value, wherein the truncated hash value is the second input, wherein the one way function generates the derived key based on the truncated hash value of the public key and the base key.

\* \* \* \* \*

UNITED STATES PATENT AND TRADEMARK OFFICE
CERTIFICATE OF CORRECTION

PATENT NO. : 11,042,488 B2  
APPLICATION NO. : 15/166700  
DATED : June 22, 2021  
INVENTOR(S) : Kumar Page 1 of 1

It is certified that error appears in the above-identified patent and that said Letters Patent is hereby corrected as shown below:

In the Specification

In Column 7, Line 53, before "(e.g., multiplexer)." delete "814".

In Column 10, Line 27, replace "(903)" with --(901)--.

In Column 10, Line 28, after "$K_{START,P\ 1}$" add --(903)--.

In Column 10, Line 29, after "$K_{START,P\ 1}$" add --(903)--.

Signed and Sealed this  
Thirteenth Day of February, 2024

Katherine Kelly Vidal  
*Director of the United States Patent and Trademark Office*